United States Patent

Schmermund

[15] 3,702,574
[45] Nov. 14, 1972

[54] CONTROL ARRANGEMENTS FOR AN AUTOMATIC MACHINE TOOL

[72] Inventor: Alfred Schmermund, 62, Kornerstrasse, 5820, Gevelsberg, Germany

[22] Filed: Oct. 8, 1970

[21] Appl. No.: 79,100

[30] Foreign Application Priority Data

Oct. 23, 1969 Great Britain..........52,037/69

[52] U.S. Cl.......................90/13 B, 90/13.9, 74/108
[51] Int. Cl...............................................B23c 1/16
[58] Field of Search........90/13.9, 13 B; 74/108, 109, 74/110 F

[56] References Cited

UNITED STATES PATENTS 3,437,007 4/1969 Schmermund..............90/13.9

Primary Examiner—Andrew R. Juhasz
Assistant Examiner—Z. R. Bilinsky
Attorney—Nolte and Nolte

[57] ABSTRACT

This invention relates to a control arrangement for an automatic machine tool wherein a master cam is mounted on a movable carrier. The shape of the master cam is sensed by a main follower which controls a milling tool operating in a rotating workpiece. An auxiliary cam is rotated with the workpiece and an auxiliary follower co-operates with the auxiliary cam. The auxiliary follower is coupled to the carrier and the coupling is selectably operable to cause displacement of the master cam in either one of two mutually opposite directions in response to displacement of the auxiliary follower in a predetermined direction. The profile of the master cam has two linear portions at respectively opposite ends of its profile and each linear portion is parallel to the direction of displacement of the carrier, whereby the displacement of the master cam when the main follower is in contact with either one of the linear end portions does not result in displacement of the master follower.

4 Claims, 4 Drawing Figures

INVENTOR
ALFRED SCHMERMUND
BY
Nolte & Nolte
ATTORNEYS

CONTROL ARRANGEMENTS FOR AN AUTOMATIC MACHINE TOOL

BACKGROUND OF THE INVENTION

The present invention relates to a control arrangement for an automatic machine tool for providing curves on workpieces and is an improvement in or a modification of the invention described in U.S. Pat. No. 3,437,007. The main claim of U.S. Pat. No. 3,437,007 is as follows:

A control arrangement for an automatic machine tool comprising in combination:
a movable carrier;
an original curve member mounted on said carrier;
means sensing the shape of said curve member;
means for displacing and moving said sensing means and said original curve member relative to each other;
means remote from said curve member and sensing means influencing the relative movement therebetween;
control means in association with said curve member and sensing means for controlling the movement of a machine tool head;
means linking said influencing means with said curve member and sensing means;
said influencing means being capable of varying the speed of relative movement of said sensing means and said original curve member;
said control means including a movable control member;
means for selectively positioning said control means whereby the ratio of movement of said sensing means and movement of said control member can be varied.

The arrangement described in the above mentioned patent has for certain purposes the disadvantage that some distortion of the path followed by an auxiliary follower included in the influencing means occurs at the transitions between arcuate flanks and a circular portion of the profile of a co-operating auxiliary cam.

SUMMARY OF THE INVENTION

According to the present invention, there is provided a control arrangement for an automatic tool comprising a main follower arranged to sense the profile of a master cam, control means responsive to the main cam follower and means including an auxiliary cam and auxiliary follower for influencing the time during which the sensing means senses portions of the master cam, the auxiliary follower controlling movement of the master cam, and means for varying the ratio of movement of the main follower to movement of a control member of the control means, at least one portion of the profile of the master cam being linear and substantially parallel to the direction of movement of the master cam, the arrangement being such that when the control means is connected to the tool head of the machine and the auxiliary cam is moved in dependence on the rotation of a workpiece, the movement of the master cam whilst the main follower is in contact with the or each linear portion does not result in displacement of the main follower so that the control of the tool is dependent on the shape of the master cam and on a predetermined influence exerted by the auxiliary cam and the ratio varying means.

Preferably, the profile of the master cam comprises two said linear portions located at opposite ends of the profile and substantially parallel to the direction of movement of the master cam.

Preferably, the auxiliary follower controls the movements of the master cam by means of a coupling which is selectably operable to cause displacement of the master cam in either one of two mutually opposite directions in response to displacement of the auxiliary follower in a predetermined direction.

Preferably, the coupling comprises a belt drive attached to a support carrying the master cam, the belt drive passing round a drum and a pulley, and means selectably operable either to rotate the drum in the first direction or in the second direction in response to displacement of the auxiliary follower in the predetermined direction.

BRIEF DESCRIPTION OF THE DRAWINGS

An embodiment of the present invention will now be more particularly described with reference to the accompanying drawings, in which.

DESCRIPTION OF THE PREFERRED EMBODIMENT

Figure 2:
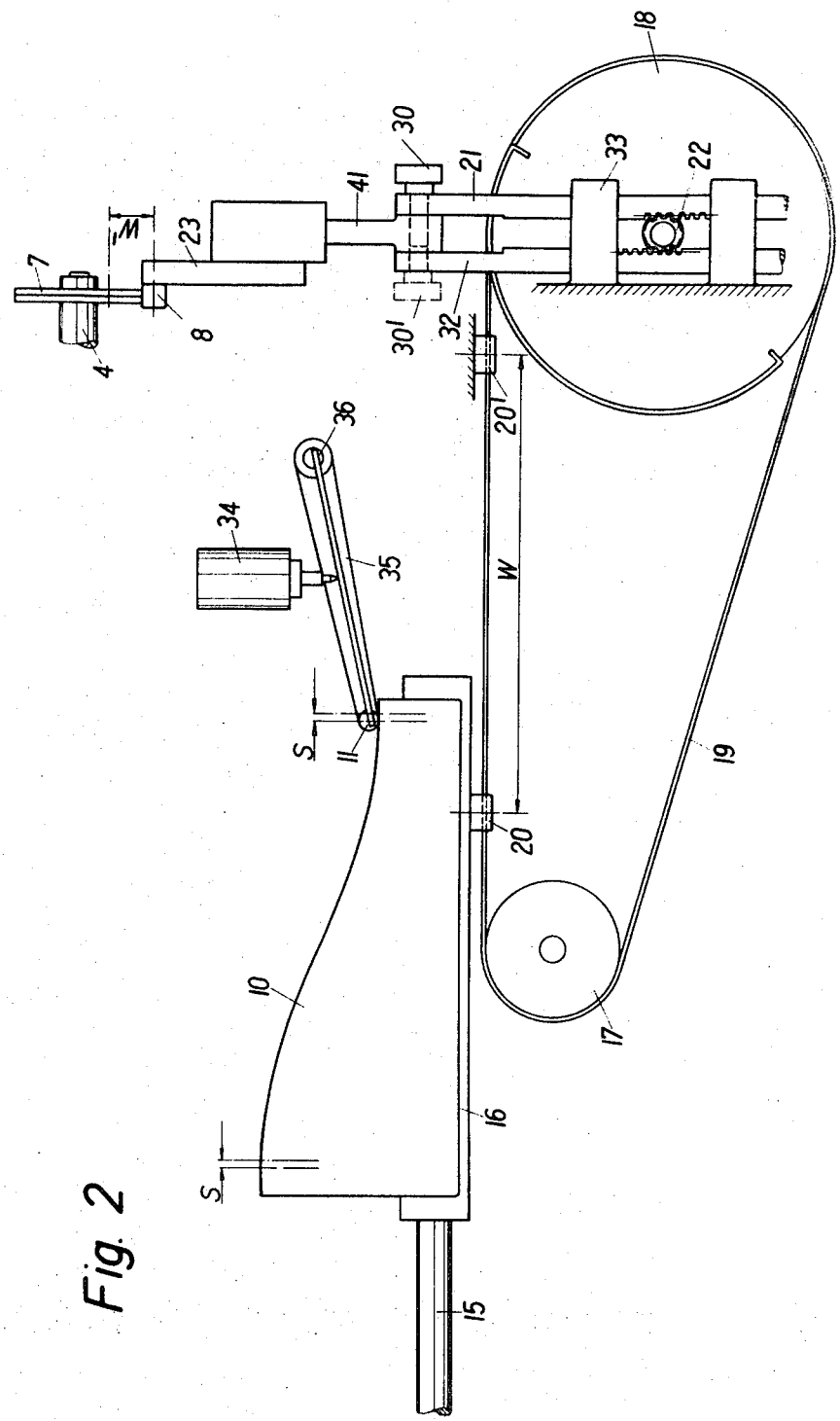
FIG. 2 shows an arrangement for displacing a master cam in accordance with displacements of an auxiliary follower which follows the profile of an auxiliary cam.

As described in U.S. Pat. No. 3,437,007, the movement of a tool for cutting the cam produced by an automatic tool is controlled in response to displacement of a master follower 34 (FIG. 2). The master follower 34 is coupled to a roller follower 11 by means of a lever 35, which is pivotally supported by a bearing 36. The master follower 34 follows the profile of a master cam 10 as the master cam is displaced on its mounting 16 along a guide shaft 15. The displacement of the master cam 10 is controlled by an auxiliary timing cam 7, which is rotatably mounted on a shaft 4. The cam 7 is rotated synchronously with a workpiece, which is cut by the tool to form a cam. The auxiliary cam 7 displaces an auxiliary cam follower 8 and the displacement of the auxiliary follower 8 is transmitted via coupling members 23, 41 and 21 or 32 to a drum 18. Two alternative coupling members 21 and 32 are provided and their selection will be explained subsequently. The motion of the auxiliary follower is transmitted to either the coupling member 32 or the coupling member 21, according to which of these members is engaged by means of a pin 30. Each of the coupling members 21 and 32 is provided with a rack, as shown in FIG. 2, which engages a pinion 22 attached to the drum 18. Consequently, the drum 18 rotates and causes the belt drive 19, passing over a pulley wheel 17, to be displaced. As shown in FIG. 2 the support 16 of the master cam 10 is attached by means of a clamping member 20 to the belt drive 19.

As the auxiliary cam 7 rotates, a displacement W' is imparted to auxiliary follower 8 and this displacement produces a displacement W of the master cam 10. The transmission ratio of the coupling between the auxiliary cam 7 and the master cam 10 determines the relative dimensions of the displacement W' and W. The transmission ratio may for example, be 10:1.

Figure 1:
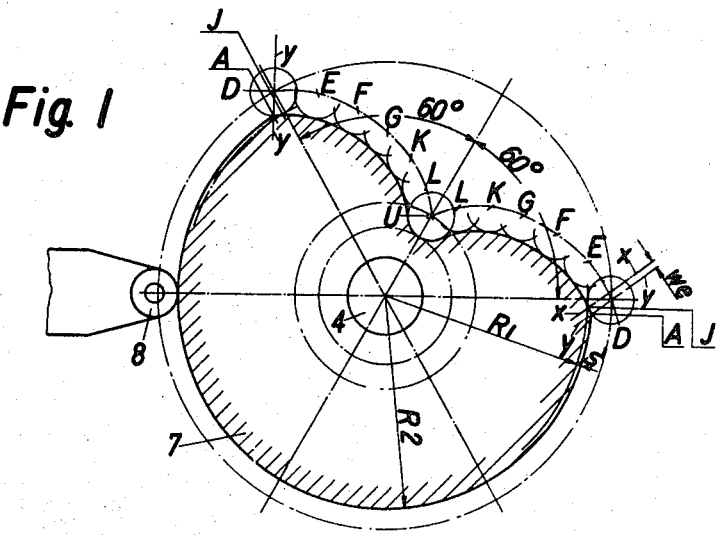
FIG. 1 shows the profile of an auxiliary timing cam and the curve followed by the center of the follower.

FIG. 1 shows an example of the profile of the auxiliary cam 7 of FIG. 2. As shown in FIG. 1, the cam 7 is so profiled as to impart an outward, or vertically downward in FIG. 2, displacement to the auxiliary follower 8 during a 60° angular rotation of the cam 7, if the auxiliary follower is initially assumed to be located at the internal transition point U of the arcuate path D E F G K L L K G F E D. This curve shows successive positions of the center of the auxiliary follower 8 relative to the profile of the auxiliary cam 7. The next 240° of angular rotation of the auxiliary cam 7 produce no displacement of the follower 8 and the remaining 60° of angular rotation produce an inward, vertically upwards in FIG. 2, displacement of the auxiliary follower 8. Thus, as the auxiliary cam 7 rotates, the auxiliary follower 8 displaced by a distance equal to the difference between the radius of the circular portion of the profile and the minimum radius of the cam which, as shown in FIG. 1, corresponds to the portion of the profile supporting the follower 8 when the center of the follower is located at the internal transition point U. Assuming, for example, that the requisite displacement of the master cam 10 is 720 mm then, if the transmission ratio is 10:1, the auxiliary cam is required to impart a displacement of 72 mm to the auxiliary follower during each rotation of the auxiliary cam 7. The requisite displacement is imparted to the auxiliary follower 8 if the radius of the circular portion of the profile of the cam 7 is R1. As indicated above, the path required to be followed by the center of the roller of the auxiliary follower 8, which is an Archimedes spiral, is represented by the curve passing through the points D E F G K L U L K G F E D. However, as indicated in FIG. 1, the position of the roller of the auxiliary follower 8 is indicated by the line $xx$ when the roller reaches the transition between the arcuate flank of the profile and the rest cicle of radius R1.

Thus, if the cam 7 is provided with a rest circle of radius R1, which is determined by transmission ratio of the coupling between the cams 7 and 10 and by the requisite displacement of the master cam 10, the center of the roller of the auxiliary follower does not follow the portion WE of the Archimedes spiral, at the external transitions between the arcuate flanks of the cam profile and the rest circle. Thus, some marginal distortion in the path followed by the auxiliary follower occurs.

In order to ensure that the path of the center of the auxiliary follower 8 does conform to an Archimedes spiral, the radius of the rest circle of the cam 7 is extended by an amount S?, as shown in FIG. 1. This extension of the radius of the rest circle, provides a corresponding extension of the arcuate flanks of the profile and, as indicated in FIG. 1, this extension shifts the extreme support point of the roller of the auxiliary follower 8 from J to A. When the roller of the auxiliary follower is supported at the point A, its center is located at the point D, which is the terminating point of the Archimedes spiral. However, extending the radius of the rest circle to R2, that is R1 + S', increases the displacement of auxiliary follower 8 by the amount S'. Thus, the displacement imparted to the auxiliary follower now exceeds the requisite displacement, which corresponded to the displacement of the master cam 10. Assuming that the transmission ratio of the coupling between the auxiliary cam 7 and the master cam 10 is such that the increase S' in the displacement of the auxiliary follower results in a corresponding movement S in the displacement of the master cam, it follows the master cam 10 will be displaced by an amount S beyond the prescribed limit set by the length of its control profile.

In order to compensate for the effects of this increased displacement of the master cam 10, the cam profile is provided with at least one linear portion which is parallel to the direction of its displacement. The location of the linear portions of length S is appropriately indicated in the profile of the master cam 10 shown in FIG. 2. Since these portions are horizontal, in FIG. 2, movement of the roller 11 of the master follower 34 over these extended portions does not result in any vertical displacement of the master follower 34.

Therefore, the provision of the horizontal portions S on the profile of the master cam 10 enables the radius of the rest circle of the auxiliary cam to be extended by a corresponding amount S', so as to avoid the distortion in the Archimedes spiral which has been described above.

Figure 3:
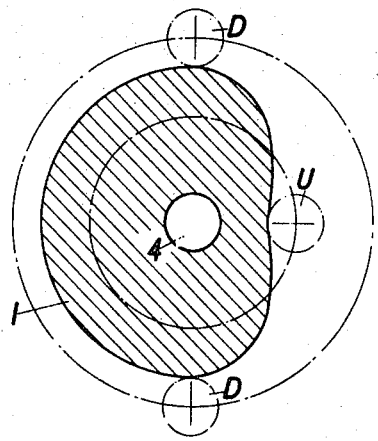
FIG. 3 shows the profile of another cam.
Figure 4:
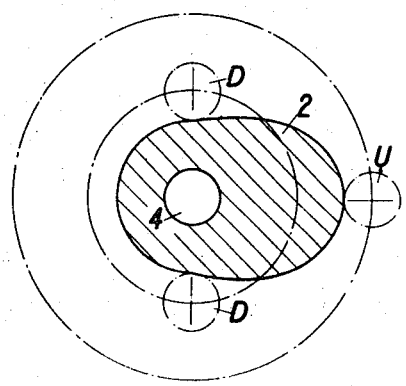
FIG. 4 shows the profile of a further cam.

FIGS. 3 and 4 show the profile of two cams. The cam profile shown in FIG. 3 is similar to that shown in FIG. 1 in that the points of transition D are located outside the internal transition point U. Cams of this type can be machined by means of the cam cutting arrangement which has been described in U.S. Pat. No. 3,437,007. However, cams of the type shown in FIG. 4 cannot be manufactured by means of the cam cutting arrangement which has been described in the aforementioned U.S. Pat. No. 3,437,007 because the transition point U occurs externally.

In order to enable cams of the type shown in FIG. 4 to be machined, a second coupling member, indicated in FIG. 2 by the reference 32, is provided. The second coupling member 32 is connected by the pin 30' to coupling member 41 and by means of the pinion 22 to the drum 18. Thus, the coupling members 21 and 32 are alternatively connected to transmit displacement of the auxiliary follower 8 to the master cam 10, depending on whether the time controlling auxiliary cam 7 has its transition point located internally, as shown in FIG. 3, or externally as shown in FIG. 4.

The profile of the master cam 10 may be provided with two linear end portions S located at opposite extremes of the profile, each such portion being substantially parallel to the direction of movement of the master cam 10. Thus, the position of the master cam 10 can be adjusted to utilize the appropriate linear overrun portions S in accordance with the type of cam to be machined.

A single coupling member, for example, the coupling member indicated by the reference 21 in FIG. 2, may be employed. In this case, the coupling member is transposed so as to engage either one side of the pinion 22, or the other side, in dependence on whether the auxiliary cam 7 has its transition point located internally or externally.

By locating a coupling member in the position indicated by the reference 32 in FIG. 2, as compared to locating a coupling member in the position indicated by reference 21, the effect of the auxiliary cam 7 on the displacement of the master cam 10 is reversed. This reversal results in the correct transition point of the cam to be machined being transferred to the outside so that cams of the type shown in FIG. 4 may be accurately machined.

I claim:

1. A control arrangement for an automatic machine tool comprising in combination:
   a support;
   a movable carrier mounted on said support;
   an original curve member mounted on said carrier;
   a main follower in contact with the original curve of said curve member;
   control means in association with said curve member and said main follower to control the movement of a machine tool head relative to a workpiece;
   an auxiliary cam;
   an auxiliary follower arranged to co-operate with said auxiliary cam; drive means to rotate said auxiliary cam with the workpiece;
   a drum rotatably mounted on said support;
   a pulley rotatably mounted on said support;
   a belt drive passing around said drum and said pulley and attached to said carrier;
   means coupling said drum to said auxiliary follower to rotate said drum in response to displacement of said auxiliary follower;
   at least one end portion of the original curve of said curve member being linear and substantially parallel to the direction of displacement of said carrier, whereby the displacement of said curve member when said main follower is in contact with said linear portion thereof results in said main follower remaining static.

2. An arrangement as defined in claim 1, wherein said original curve member comprises a plate cam member.

3. An arrangement as defined in claim 1, wherein the original curve of said curve member comprises two linear portions respectively located at opposite ends of said original curve and each disposed substantially parallel to the direction of displacement of said carrier.

4. An arrangement as defined in claim 1, wherein said coupling means is selectably operable to cause displacement of said carrier in either one of two mutually opposite directions in response to displacement of said auxiliary follower in a predetermined direction.

* * * * *